Figure 1:
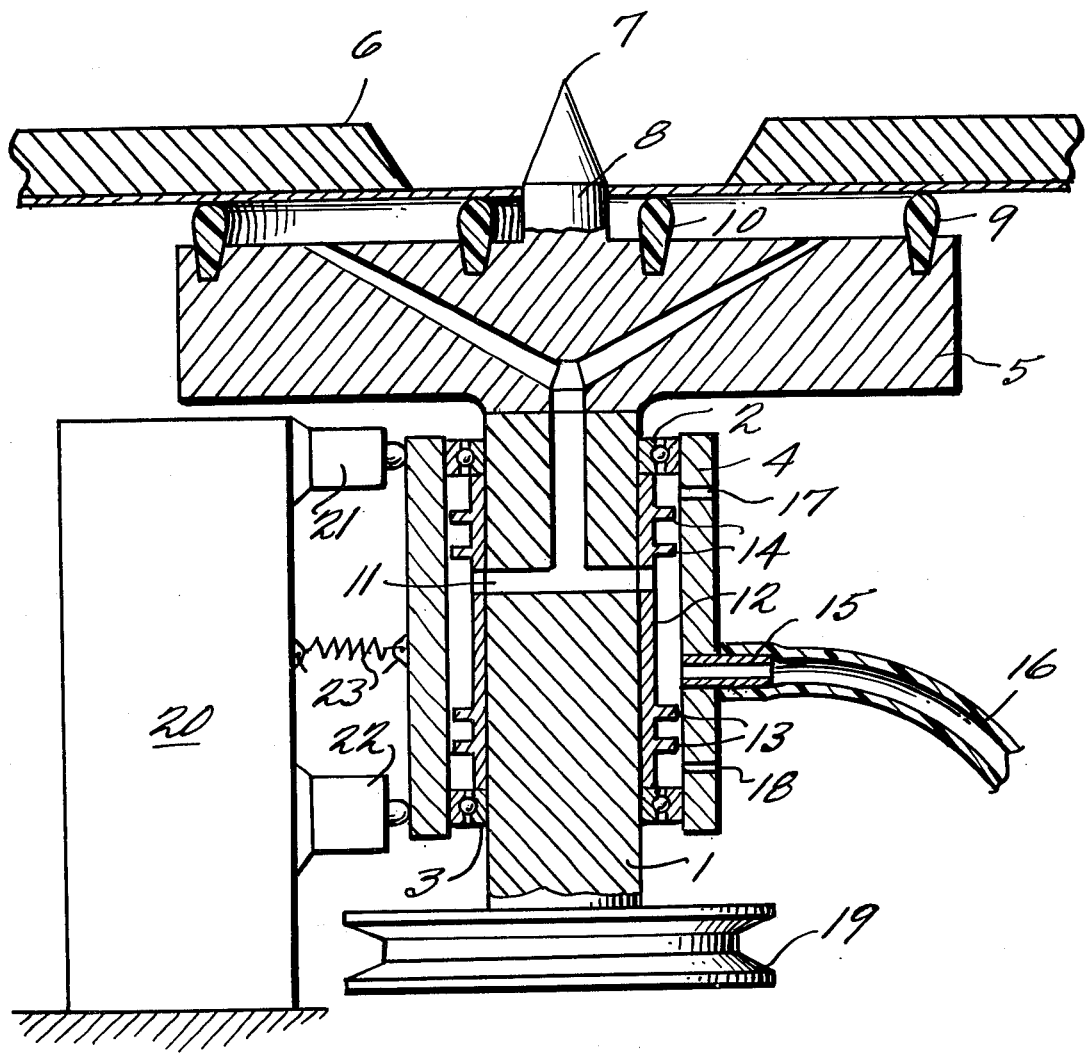

United States Patent [19]

Muller

[11] 4,031,760

[45] June 28, 1977

[54] APPARATUS FOR BALANCING MACHINES FOR CHUCKING AND CENTERING OF ANAXIAL BODIES OF ROTATION

[75] Inventor: Richard Muller, Lynchburg, Va.

[73] Assignee: Gebr. Hofmann KG, Darmstadt, Germany

[22] Filed: Apr. 14, 1976

[21] Appl. No.: 676,674

[30] Foreign Application Priority Data

May 20, 1975 Germany .......................... 2522260

[52] U.S. Cl. .................................. 73/460; 73/462; 73/487
[51] Int. Cl.² .......................................... G01M 1/04
[58] Field of Search ................. 279/3; 73/460, 462, 73/487; 51/235; 269/21

[56] References Cited

UNITED STATES PATENTS

| 2,701,723 | 2/1955 | Ekberg ................................ 279/3 |
| 2,955,829 | 10/1960 | Brewster ............................. 279/3 |
| 3,706,412 | 12/1972 | Latham ............................ 279/3 X |
| 3,774,456 | 11/1973 | Crump ............................... 73/462 |

FOREIGN PATENTS OR APPLICATIONS 569,584  5/1945  United Kingdom .................... 279/3

*Primary Examiner*—James J. Gill
*Attorney, Agent, or Firm*—Cushman, Darby & Cushman

[57] ABSTRACT

An apparatus for clamping and centering bodies during rotation for balancing with a body receiving plate which is mounted on a spindle and which has a pair of concentric flexible rings or gaskets mounted on the upper surface thereof to define, when the body rests on the rings, a vacuum chamber from which air is removed to lock the body in place by channels which extend through the plate and communicate with the vacuum chamber. A housing extends about and is connected to the spindle by bearings with the space between the housing and spindle communicating with the vacuum chamber and with a connection extending through the housing for removing air from the vacuum chamber. Extensions of the spindle and vent holes between the housing space and the bearing prevent a vacuum from being developed in the area of the bearings.

3 Claims, 1 Drawing Figure

APPARATUS FOR BALANCING MACHINES FOR CHUCKING AND CENTERING OF ANAXIAL BODIES OF ROTATION

The invention relates to a balancing machine spindle for clamping and centering light disc-shaped anaxial rotors or the like.

For the balancing of anaxial rotors, balancing machines are often used with a spindle which has a suitable mounting and which is driven by suitable means. The free end of the spindle usually receives the anaxial rotor. This balancing spindle must on one hand have a sufficiently good concentricity precision and on the other hand it must be developed such that it will be able to hold the rotor that is to be balanced in tension. The connection between spindle and rotor must be at least so great that during acceleration and deceleration, the rotor can not twist or slip in relation to the axis. On the other hand the chucking arrangement must have a high centering precision, since otherwise the desired balancing quality will not be achieved. The centering precision must be ensured, even if certain tolerances are permitted in the diameter of the bore of the rotor.

In case of known balancing machines, so called play-compensating clamping devices are used for this purpose and are developed such that they clamp over a certain area of the diameter and thus bridge the tolerance of the bore. Such expanding clamping devices are sufficient in a few cases for the power-coupled clamping of the rotor against the balancing spindle, so that no twisting of the rotor against the balancing spindle takes place during acceleration and deceleration. In many cases, especially for rotors with small bore diameters, the expanding clamp alone is not sufficient to drive the rotor. In that case the clamping apparatus is provided with an additional axial cross-feed mechanism. The rotor is pulled against a face with a large diameter, so that better drive is provided. The disadvantage of these clamping devices however is that they are complex, greater wear occurs and, in case of very small balancing bodies, suitable clamping is difficult. Further these clamping mechanisms must be operated with compressed air or hydraulic liquid, particularly in case of automatic balancing machines, which in turn require that the compressed air on hydraulic liquid is inserted into the rotating spindle and that it must be conducted on to the piston acting in the spindle. The feeding-in of the compressed air or of the hydraulic liquid is thus accompanied in turn by problems of sealing friction in the spindle and influencing the balancing results.

This invention has as its object an improved chucking or clamping and centering apparatus for balancing machines, which is simple and which, especially in case of small rotors, can be used with small center bores.

According to the invention this problem is solved by the fact that a receiving plate is mounted at the end of the balancing spindle on which the rotor that is to be received, can be counterclamped over a certain area of its contact surface by means of a vacuum, and that the flat reception of the rotor against the clamping device is arranged axially and elastically in a certain area, so that the centering mandrel attached in the center of the clamping device can also be developed conically in a certain area. Thus, for existing diameter tolerances of the bore of the balancing body, the balancing body is centered on the centering mandrel. The feeding in of the vacuum for clamping of the balancing body takes place by means of the balancing spindle. Radial channels are disposed between the two spindle mountings, by way of which the center of the spindle is connected with the clamping mechanism. Furthermore, labyrinths are disposed between the radial channels and the spindle mounting.

For a more detailed explanation of the invention, the subsequent description of an embodiment has been presented which is shown schematically in the drawing.

FIG. 1 shows a balancing spindle 1 which is mounted in conventional bearings 2 and 3. The outside rings of the bearing 2 and 3 are attached in tension in a bearing housing 4. The balancing spindle 1 is connected centrically with clamping plate 5. The rotor 6 that is to be balanced is centered with its bore in the centering cone 8. The point 7 of the centering mandrel serves to aid placement of the rotor. Clamping plate 5 has a smaller gasket 10, elastic in an axial direction, and a larger gasket 9, between which vacuum is produced by removing air via channel 11. In case there are any tolerances for the diameter of the bore, of the balancing body 6, the gaskets 9 and 10 are pulled together axially by the vacuum producing a force-locking seat. Thus centering is always ensured in the centering cone 8.

The vacuum channel 11 consists of several channels drilled radially through the axis. The air is removed via the vacuum hose 16 and supply connection 15. Extensions 13 and 14 form a labyrinth disposed inside the spindle housing 4, between the vacuum channel 11 and the ball bearings 2 and 3 to minimize the vacuum developing in the area of the ball bearings. The labyrinth is constructed such, that there is no frictional connection from the rotating part of the spindle and bearing housing 4. In order that some vacuum will not be produced despite the not absolutely sealed labyrinths up to the ball bearings, vent bores 17 and 18 have been disposed between the extensions 13 and 14 and the bearings 2 and 3 in order to avoid the discharge of the film of grease or oil from the ball bearings. At the end of the balancing spindle 1 a pulley 19 has been attached for rotating in a known manner. In the embodiment shown, the balancing spindle is supported via two pressure gauges 21 and 22 against the locally fixed machine housing 20. The bracing of the pressure gauges 21 and 22 takes place via a spiral wound spring 23. The two pressure gauges 21 and 22 convert the alternating forces developing as a result of the unbalance during rotation into an electrical voltage, which on its part in turn serves for the determination of the unbalance values and of the phase position of the unbalance. The determination is accomplished by known means (not shown).

Many changes and modifications of the above embodiment of the invention can, of course, be carried out without departing from the scope of the invention. Accordingly, that scope is intended to be limited by the scope of the appended claims.

What is claimed is:

1. An apparatus for clamping and centering bodies during rotation for balancing comprising:
    a body receiving plate having an upper extending surface and a plurality of channels extending therethrough into a chamber,
    a spindle coupled to said plate for rotating the same and having a passage extending therethrough between said channels and an enclosed space,
    a bearing housing enclosing said spindle, a plurality of bearings disposed between said housing and said spindle, a first flexible ring attached to and extending upward from said surface, a second flexible ring attached to and extending upward from said surface and extending about said first ring to form said chamber which is sealed by a body resting on said rings, means for producing a vacuum in said chamber by removing air from said chamber via said channels, said passage and said enclosed space to clamp said body to said upper extending surface, and a centering cone extending upward from said surface within said first ring.

2. An apparatus as in claim 1 wherein said spindle has extensions between said bearings and said removing means and at least one vent between said extensions and said bearing for preventing a vacuum from being established in the area of said bearings.

3. An apparatus for clamping and centering bodies during rotation for balancing comprising:

a body receiving plate having an upper extending surface and a plurality of channels extending therethrough into a chamber;

a spindle coupled to said plate for rotating the same and having a passage extending therethrough between said channels and an enclosed space;

a bearing housing enclosing said spindle;

a plurality of bearings disposed between said housing and said spindle;

a first flexible ring attached to and extending upward from said surface;

a second flexible ring attached to and extending upward from said surface and extending about said first ring to form said chamber which is sealed by a body resting on said rings;

means for producing a vacuum in said chamber by removing air from said chamber via said channels, said passage and said enclosed space to clamp said body to said upper extending surface;

means for rotating said plate; and means for detecting imbalances of said body during rotation.

* * * * *